(12) United States Patent
Busch et al.

(10) Patent No.: US 9,136,779 B2
(45) Date of Patent: *Sep. 15, 2015

(54) DYNAMICALLY MODIFIED FAN SPEED TABLE FOR COOLING A COMPUTER

(71) Applicant: Lenovo Enterprise Solutions (Singapore) Pte. Ltd., Sinagapore (SG)

(72) Inventors: Diane S. Busch, Durham, NC (US); Troy W. Glover, Raleigh, NC (US); Whitcomb R. Scott, III, Chapel Hill, NC (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 233 days.

This patent is subject to a terminal disclaimer.

(21) Appl. No.: 13/663,538

(22) Filed: Oct. 30, 2012

(65) Prior Publication Data

US 2014/0117906 A1   May 1, 2014

(51) Int. Cl.
*H02P 1/04* (2006.01)
*G06F 1/20* (2006.01)

(52) U.S. Cl.
CPC . *H02P 1/04* (2013.01); *G06F 1/206* (2013.01)

(58) Field of Classification Search
CPC .......... G05B 11/28; H02P 7/29; F04D 27/004
USPC .................................. 318/461, 471, 599, 811
See application file for complete search history.

(56) References Cited

U.S. PATENT DOCUMENTS

| | | | | |
|---|---|---|---|---|
| 5,249,741 A | * | 10/1993 | Bistline et al. | 236/49.3 |
| 6,104,003 A | * | 8/2000 | Jones | 219/400 |
| 6,188,189 B1 | * | 2/2001 | Blake | 318/471 |
| 6,470,289 B1 | * | 10/2002 | Peters et al. | 702/132 |
| 6,725,132 B2 | * | 4/2004 | Frankel et al. | 700/300 |
| 7,075,261 B2 | * | 7/2006 | Burstein | 318/400.11 |
| 7,202,624 B2 | | 4/2007 | Hardt et al. | |
| 7,375,486 B2 | | 5/2008 | Ku et al. | |
| 7,620,827 B2 | | 11/2009 | Muraki | |
| 7,676,302 B2 | * | 3/2010 | Frankel et al. | 700/300 |
| 8,150,561 B2 | | 4/2012 | Shimotono et al. | |
| 8,159,160 B2 | | 4/2012 | Dishman et al. | |
| 8,749,187 B2 | * | 6/2014 | Busch et al. | 318/461 |
| 2007/0047199 A1 | | 3/2007 | Tsutsui | |
| 2010/0228403 A1 | | 9/2010 | Eto | |
| 2012/0010754 A1 | | 1/2012 | Matteson | |
| 2012/0053734 A1 | | 3/2012 | Kazama et al. | |

* cited by examiner

*Primary Examiner* — Rina Duda
(74) *Attorney, Agent, or Firm* — Katherine S. Brown; Jeffrey L. Streets

(57) ABSTRACT

A computer program product including computer usable program code embodied on a computer usable medium for controlling a temperature within a computer system using a fan. The computer program product includes computer usable program code for monitoring the temperature within the computer system; dynamically selecting a fan speed step in response to the temperature, wherein the fan speed step is selected from a fan speed table defining a finite number of fan speed steps each having an associated fan speed; operating a fan at the dynamically selected fan speed step; measuring a fan output variation is measured over a prescribed time interval; and automatically modifying the fan speed table to change the fan speeds associated with each fan speed step, wherein the fan speeds are changed as a function of the measured fan output variation while continuing to drive the fan.

7 Claims, 3 Drawing Sheets

Default Fan Speed Table — 30

| Fan Speed Step | Fan Speed (RPM) |
|---|---|
| #1 | 4000 |
| #2 | 4800 |
| #3 | 5600 |
| #4 | 6400 |
| #5 | 7200 |
| #6 | 8000 |
| #7 | 8800 |
| #8 | 9600 |
| #9 | 10400 |
| #10 | 11200 |
| #11 | 12000 |
| #12 | 12800 |
| #13 | 13600 |
| #14 | 14400 |
| #15 | 15200 |
| #16 | 16000 |

FIG. 2

Modified Fan Speed Table (Finer Granularity) — 30

| Fan Speed Step | Fan Speed (RPM) |
|---|---|
| #1 | 8000 |
| #2 | 8213 |
| #3 | 8427 |
| #4 | 8640 |
| #5 | 8853 |
| #6 | 9067 |
| #7 | 9280 |
| #8 | 9493 |
| #9 | 9707 |
| #10 | 9920 |
| #11 | 10133 |
| #12 | 10347 |
| #13 | 10560 |
| #14 | 10773 |
| #15 | 10987 |
| #16 | 11200 |

FIG. 3

DYNAMICALLY MODIFIED FAN SPEED TABLE FOR COOLING A COMPUTER

BACKGROUND OF THE INVENTION

1. Field of the Invention

The present invention relates to a fan control method for cooling a computer system.

2. Background of the Related Art

Computer systems typically include a number of electronic components disposed within a chassis. These components generate heat as a byproduct of electrical power consumption, and require a cooling system to prevent the components from overheating and experiencing thermal damage. A common cooling system includes one or more fans for inducing airflow through the chassis across the electronic components. For example, a personal computer (PC) or server may include one or more onboard fans provided inside the chassis of the PC or server. In larger computer systems, such as in a rack-mounted computer system, a shared blower module having one or more fans may be provided in a chassis for cooling multiple servers mounted in a common chassis. For larger computer systems, such as in a datacenter, a more comprehensive cooling system may include a dedicated computer room having specialized HVAC equipment and a particular arrangement of racks that includes alternating hot and cold aisles.

The large, high-speed fans and blower modules used for cooling servers and other information technology equipment are the primary source of noise in a datacenter. A datacenter typically includes many densely-packaged rack-mounted servers and many fans. The combined noise of the many fans and blower modules in a datacenter produce an undesirable level of noise. Additionally, the many fans and blower modules in a datacenter contribute significantly to the power consumption of the datacenter. Unfortunately, limiting or reducing the amount of airflow through the computer system can require reducing the load on a processor, which causes the computer to run at less than its full processing capacity. In order to allow such large computer systems to operate at full processing capacity or performance, the data center may be physically separated from office spaces to reduce the noise and discomfort experienced by employees. Policies may also require noise levels to be reduced below prescribed limits whenever a person is in the data center.

BRIEF SUMMARY OF THE INVENTION

Another embodiment of the invention provides a computer program product including computer usable program code embodied on a computer usable medium for controlling a temperature within a computer system using a fan. The computer program product comprises: computer usable program code for monitoring the temperature within the computer system; computer usable program code for dynamically selecting a fan speed step in response to the temperature, wherein the fan speed step is selected from a fan speed table defining a finite number of fan speed steps each having an associated fan speed; computer usable program code for operating a fan at the dynamically selected fan speed step; computer usable program code for measuring a fan output variation over a prescribed time interval; and computer usable program code for automatically modifying the fan speed table to change the fan speeds associated with each fan speed step, wherein the fan speeds are changed as a function of the measured fan output variation while continuing to drive the fan.

BRIEF DESCRIPTION OF THE SEVERAL VIEWS OF THE DRAWINGS

FIG. 2 is a visual representation of a fan speed table with default fan speed steps (i.e. the default fan speed table).

FIG. 3 is a visual representation of the fan speed table as modified to narrow the associated range of fan speeds and increase the level of fan-control granularity according to the fan output variation observed in a prescribed time interval.

DETAILED DESCRIPTION OF THE INVENTION

Figure 1:
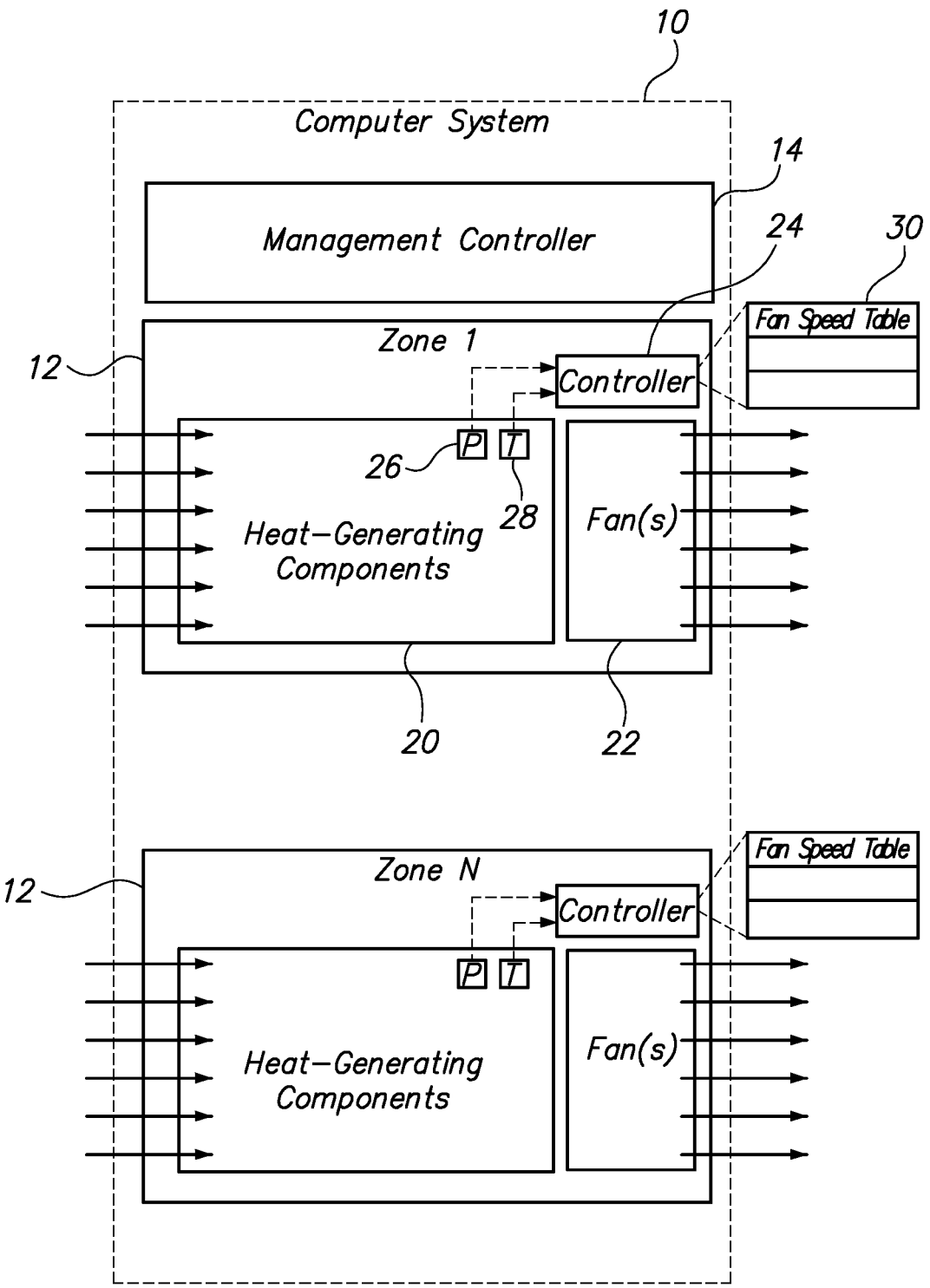
FIG. 1 is a schematic diagram of a computer system cooled by fans according to a dynamically modified fan speed table.

Embodiments of the present invention provide a computer system and a related cooling method for cooling the computer system using a dynamically modified fan speed table. The fan speed table defines a finite number of discrete fan speed steps, wherein each fan speed step is associated with a different fan speed at which the fan is capable of operating. A default set of the fan speeds in the table may cover a wide range of associated fan speeds, up to the full range of fan speed at which the fan is capable of operating. When cooling the computer system, a fan speed step is dynamically selected from the fan speed table as a function of a variable system parameter that relates to how much cooling is needed, such as a temperature or power consumption. For example, successive temperature thresholds may be defined in the fan speed table or a fan control algorithm, whereby the fan speed is incrementally adjusted up or down by one or more fan speed steps as temperature changes from one threshold to the next. The default fan speeds provide a predefined fan control granularity that elicits a faster, more responsive cooling system response as compared with using the fan's native granularity (e.g. a greater number of more closely-spaced fan speed steps) or a continuously variable fan (i.e. approaching infinite granularity). The fan speed table may also be dynamically modified to adapt to recent cooling system behavior.

In one embodiment, a fan output variation is measured over a prescribed time interval. The fan output variation may be measured as a variation in the dynamically selected fan speed steps, a fan speed, a fan voltage, or a fan power consumption, for example. The fan speed table is then automatically modified to change the values of the fan speeds associated with each fan speed step to provide a refined granularity around the current operating point. For example, if the fan has been operating over a relatively narrow portion of its full range of operability over a prescribed time interval, the fan speeds may be modified to narrow the range of fan speeds, without changing the number of fan speed steps in the fan speed table. Narrowing the range of fan speeds over the same number of fan speed steps results in a finer granularity that reduces the acoustic signature associated with each incrementing from one fan speed step to the next fan speed step. In one aspect, the change in the sound and volume between successive fan speed steps is less noticeable as a result of the finer granularity. Additionally, the refined granularity may actually reduce the required fan speed at each temperature threshold, to reduce overall system sound pressure levels. In accordance with the present invention, it is not necessary to re-flash the controller firmware in order to modify the fan speed table, and the table may be dynamically modified while the cooling system continues to operate.

One embodiment of the invention provides a computer-implemented fan control method. The method comprises measuring a temperature within a computer system and dynamically selecting a fan speed step in response to the temperature received, wherein the fan speed step is selected from a fan speed table defining a finite number of fan speed steps each having an associated fan speed. The method further comprises operating a fan at the dynamically selected fan speed step, wherein the fan is positioned to drive air through the computer system where the temperature is being measured. The fan output variation is measured over a prescribed time interval and the fan speed table is automatically modified to change the fan speeds associated with each fan speed step, wherein the fan speeds are changed as a function of the measured fan output variation while continuing to drive the fan.

Another embodiment of the invention provides a computer program product including computer usable program code embodied on a computer usable medium for controlling a temperature within a computer system using a fan. The computer program product comprises: computer usable program code for monitoring the temperature within the computer system; computer usable program code for dynamically selecting a fan speed step in response to the temperature, wherein the fan speed step is selected from a fan speed table defining a finite number of fan speed steps each having an associated fan speed; computer usable program code for operating a fan at the dynamically selected fan speed step; computer usable program code for measuring a fan output variation over a prescribed time interval; and computer usable program code for automatically modifying the fan speed table to change the fan speeds associated with each fan speed step, wherein the fan speeds are changed as a function of the measured fan output variation while continuing to drive the fan.

FIG. 1 is a schematic diagram of a computer system 10 cooled by fans 22 that are controlled according to a dynamically modified or updated fan speed table 30. The computer system 10 is generically diagrammed in FIG. 1 to cover a variety of different types of computer systems that may be cooled according to the disclosed methods. The type and scale of the computer system 10 may range from a standalone, general purpose PC to a large datacenter computer system having many racks of servers and supporting equipment. The diagram for the computer system 10 is generally outlined as having any number "N" of independently-cooled zones 12. Each zone 12 is shown as having a set of heat-generating components 20, at least one fan 22 configured for generating airflow across or through the heat-generating components 20, and a fan controller 24 for controlling the fan 22 in that zone 12 according to the dynamically modified fan speed table 30.

Applying the diagram to a standalone PC, for example, a first zone 12 may be a PC chassis cooled by a primary chassis fan and a second zone 12 may be a component having a dedicated fan such as a high-performance graphics card. On a much larger scale, the diagram could instead be applied to a datacenter wherein each zone 12 is a different equipment rack or aisle of racks. In that context, the fan(s) 22 may represent one or more fans of one or more rack-mounted blower modules. Each instance of a fan speed table 30 may be used to control a specific fan or a group of fans 22 in a particular zone 12. A management controller 14 optionally presides over the multiple zones of the computer system 10. In the context of a standalone PC, the management controller 14 may include a baseboard management controller (BMC). Alternatively, in the context of a datacenter, the management controller 14 may include a chassis management module or datacenter management console, which optionally provides system-wide or data-center-wide policy settings for power consumption and cooling.

A fan control method discussed with reference to Zone 1 may be independently applied to cooling each of the N zones. Referring to Zone 1, the heat-generating components 20 consume electrical power and generate heat as a byproduct of consuming the electrical power. The fan 22 generates airflow across or through the components 20 to remove the heat. The difference between the rate of heat generation and rate of heat removal determines a changing temperature in Zone 1. The temperature may be sensed directly or indirectly using one or more onboard sensors. For example, a temperature sensor 28 can be used to monitor a temperature "T" and/or a power sensor 26 can be used to monitor a power consumption "P" of the heat-generating components. These one or more system parameters may be output to the fan controller 24 for controlling the fan speed of the fan 22. As the measured temperature or power consumption changes, the airflow rate may be increased or decreased accordingly.

Figure 4:
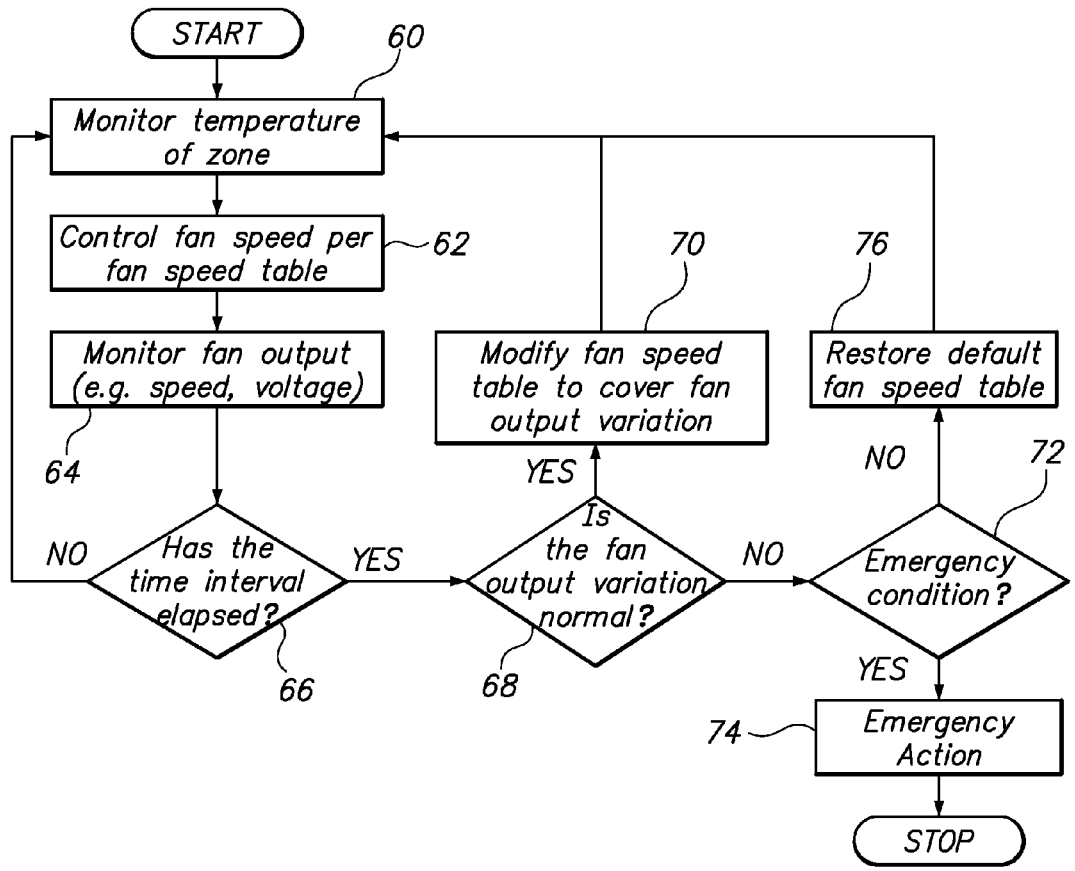
FIG. 4 is a flowchart outlining an example method for cooling a computer system, such as the computer system of FIG. 1.

The fan controller 24 controls the fan speed using the fan speed table 30 and input from the temperature sensor 28 and/or power sensor 26. The fan speed table 30 resides in memory, such as in programmable firmware in the fan controller 24. The fan speed table 30 defines a finite number of discrete fan speed steps. Each fan speed step is related to a specific value of a fan setting, such as a speed setting, or to a voltage setting, power setting, or other setting related to a fan speed and a corresponding airflow rate. The fan speed table 30 may include explicit fan speed values and the fan 22 may be capable of reporting fan speed values to the management controller 14. However, explicit fan speed values are not required to be stored in the fan speed table 30. For example, the fan speed table 30 can instead set forth a discrete voltage setting, power output setting, or other fan setting for each fan speed step that will cause the fan 22 to operate at a corresponding fan speed and airflow rate. The fan speed table may also set forth specific thresholds for selecting a fan speed step. Each threshold may be, for example, a particular temperature range for each fan speed step. The fan speed table 30 can be dynamically modified while the cooling system remains operational. FIGS. 2-4 illustrate examples of a dynamically modified fan speed table, where the fan speed associated with each fan speed step is modified in response to recent system behavior.

FIG. 2 is a visual representation of the electronic fan speed table 30 with default fan speed steps (i.e. the default fan speed table). The default fan speed table in this example has a total of sixteen fan speed steps, with one row 32 per fan speed step. Each row 32 lists parameters associated with that fan speed step. The table 30 is arranged in order of increasing fan speed (RPM). A first column identifies each of the sixteen fan speed steps 34 by an identifier, which in the figures are steps #1 to #16. A second column lists the fan speeds 35 associated with the fan speed steps 34. Again, the electronic table stored in the fan controller memory may or may not include the explicit fan speed values shown in the visual representation of the table 30 of FIG. 2. The default values for the fan speed table 30 may span all or substantially all of the full operating range of the fan. For example, the full safe operating range of the fan may be 4000 to 16000 RPM, in which case fan speed step #1 is currently associated with a minimum fan speed of 4000 RPM and fan speed step #16 is currently associated with a maximum fan speed of 16000 RPM. The remaining fan speed steps #2 through #15 are arranged in increasing order of fan speeds in the range between those minimum and maximum values.

The fan controller 24 may enforce the fan speeds associated with the dynamically-selected fan speed steps by controlling a voltage or power setting.

The difference in fan speeds between successive fan speed steps is a predefined fan speed increment. For example, increasing the fan from step #1 to step #2 increases the fan speed from 4000 to 4800 RPM, which is an increment of 800 RPM. To simplify the discussion, the fan speed may vary linearly with the associated fan speed step, for the purpose of this non-limiting example, with an increment of 800 RPM between every two consecutive fan speed steps. In the default fan speed table 30 of FIG. 2, the increments between fan speed steps are required to be fairly large in order to cover the full range of 4000 RPM to 16000 RPM in only 16 fan speed steps.

Additional set points (not shown) may also be introduced to control hysteresis, to prevent the fan controller from oscillating quickly back and forth between two fan speed settings. Set points for controlling hysteresis are omitted from the example tables to simplify discussion.

The fan speed table 30 may be modified to change the fan speed values associated with the fan speed steps. In particular, the fan speed table 30 may be modified according to a variation in the output of the fan over a prescribed time interval. The shaded portion 38 of the fan speed table 30 in FIG. 2 indicates an observed variation in fan output over a prescribed time interval, such as 30 minutes. In this example, the variation in fan output may be measured as a variation in fan speed. Alternatively, the measured fan output variation may be a variation in the dynamically selected fan speed step, a fan voltage, a fan power, or other fan output parameter that correlates with fan speed. During the prescribed time interval in this example, the fan speed has ranged from between 8000 RPM to 11200 RPM, which corresponds to fan speed steps #6 through #10. This variation during the immediately preceding 30-minute time interval may be used as a short-term prediction of what the system behavior and fan output variation may be like in the next 30-minute time interval. Accordingly, the fan speed table 30 may be dynamically modified to narrow the range of fan speeds covered by the sixteen fan speed steps about the observed range of 8000 to 11200 RPM.

FIG. 3 is a visual representation of the fan speed table 30 as modified to narrow the associated range of fan speeds and increase the level of fan-control granularity according to the fan output variation observed in the prescribed time interval. The table 30 in this example is modified to narrow the range of fan speeds to the specific fan output variation of 8000 to 11200 RPM observed in the preceding time interval. As a precaution, the table 30 could alternatively be modified to provide a wider range of fan speeds other than the observed fan output variation, such as from 7700 to 11500 RPM, which is still narrower than the default fan speed range. The narrowed fan speed range provides a finer granularity for selecting fan speed steps. The finer granularity between fan speed steps is achieved by modifying the table 30 so that the narrowed fan speed range of 8000 to 11200 RPM is now spread across the sixteen fan speed steps 34. The increment between successive fan speed steps is now significantly reduced as a result (about 213 RPM per fan speed step), which makes the fan speed increases between steps much less audible. The fan speed increments in this non-limiting example are again shown to be linear to simplify the discussion.

FIG. 4 is a flowchart outlining an example method for cooling a computer system, such as the computer system 10 of FIG. 1. A plurality of independently-cooled zones may be delineated for the system, or the computer system may be treated as a single cooling zone. Each zone may be independently cooled according to the method. Each zone contains a different set of heat-generating components and one or more fans for generating airflow through the zone to cool the heat-generating components. A fan controller controls the fan speed to control temperature in this embodiment, although other temperature-related parameters such as power consumption may be used or factored in.

In step 60, a temperature of the zone is monitored. The temperature may be a temperature of a heat-generating component in the zone, such as a processor. Alternatively, the temperature may be a temperature of airflow at a location in the zone, such as at an outlet from the zone. Step 62 includes controlling the fan speed using a fan speed table. The fan speed table sets forth a plurality of different fan speed steps, each associated with a different fan speed. The fan speed table may include explicit fan speed values associated with the fan speed steps, or values of another fan parameter related to fan speed, such as a fan voltage or fan power consumption. The fan speed controller may increment the fan speed step to increase the associated fan speed in response to an increase in the temperature being monitored and controlled. Similarly, the fan speed controller may decrement the fan speed step to decrease the associated fan speed in response to a decrease in the temperature being monitored and controlled.

Step 64 includes monitoring a fan output. The fan output may be a measured fan speed or another fan parameter correlated with fan speed, such as the fan speed step, a fan voltage output, or a fan power output. The fan output is to be monitored at a prescribed frequency (e.g. every 30 seconds) for a prescribed time interval (e.g. a 30-minute time interval). Conditional step 66 determines when the prescribed time interval has elapsed. During the prescribed time interval (and beyond), the system continues to monitor the zone temperature (step 60), control the fan speed per the fan speed table (step 62), and monitor the fan output (step 64). When the time interval has elapsed per conditional step 66, conditional step 68 determines whether the fan output variation during the prescribed time interval was normal, such as whether the fan output variation was within a predefined range. For example, the average and standard deviation of the fan output (e.g. of the fan RPMs) may be calculated as a measure of the fan output variation. A normal variation may be defined by a standard deviation threshold of up to 25%, for example. If the fan output variation is normal (i.e. less than 25% in this example), then step 70 modifies the fan speed table according to the fan output variation observed during the expired time interval. The table modification may implement a finer granularity and/or to reduce the overall fan speed, like in the previous examples of FIGS. 3 and 4. The table modification may include narrowing and/or shifting the range of fan speeds, while still including at least the range of fan speeds or other fan output variation observed during the expired time interval.

If the fan output variation is not normal per conditional step 68 (i.e. greater than 25% in this example), then conditional step 72 checks for an emergency condition which requires emergency action per step 74. The emergency condition may be identified as a thermally-related event log entry, for instance. If the fan output variation (greater than 25%) is not normal but also not an emergency condition, then the default values of the fan speed table may instead be restored per step 76. Restoring the default fan speed table may return to having the fan's full range of operability.

A modified fan speed table preferably allows for at least the range of fan output observed in a preceding time interval. For example, a fan output variation may be a fan speed variation of 8000 to 11200 RPM observed in an immediately-preceding time interval, in which case the modified fan speed table preferably allows for at least that same 8000 to 11200 RPM fan speed variation, or a slightly wider range of fan speeds such as 7700 to 11500 RPM. If the monitored temperature (step 60) during the course of a particular prescribed time interval (step 66) goes outside of the temperature range provided for in the temperature thresholds, then another table modification might be performed prior to expiration of the current time interval. If the temperature falls below a lower temperature threshold, then an immediate modification may not be warranted, since the current fan speed would be sufficient for cooling. If the monitored temperature exceeds an upper temperature threshold specified in the modified fan speed table, however, then a further immediate modification may be warranted to prevent overheating.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A non-transitory computer-readable medium with an executable program stored thereon, wherein the program instructs a computer to perform the following steps:
   monitoring the temperature within the computer system;
   dynamically selecting a fan speed step in response to the temperature, wherein the fan speed step is selected from a fan speed table defining a finite number of fan speed steps each having an associated fan speed;
   operating a fan at the dynamically selected fan speed step;
   measuring a fan output variation over a prescribed time interval;
   automatically modifying the fan speed table to change the fan speeds associated with each fan speed step, wherein the fan speeds are changed as a function of the measured fan output variation while continuing to drive the fan; and
   obtaining an upper and lower fan output value from the measured fan output variation and changing a minimum fan speed step, a maximum fan speed step, and a spacing between fan speed steps in the fan speed table according to the measured fan output variation.

2. The computer-readable medium of claim 1, wherein measuring a fan output variation over a prescribed time interval includes obtaining an average and a standard deviation of the fan output over the prescribed time interval.

3. The computer-readable medium of claim 1, wherein measuring the fan output variation comprises obtaining a variation in fan speed, a variation in the dynamically selected fan speed step, a variation in a fan voltage, or a variation in a fan power.

4. The computer-readable medium of claim 1, wherein measuring the fan output variation includes measuring the fan output variation at preset intervals within the prescribed time interval, and wherein automatically modifying the fan speed table includes automatically modifying the fan speed table in response to expiration of the prescribed time interval.

5. A non-transitory computer-readable medium with an executable program stored thereon, wherein the program instructs a computer to perform the following steps:
   monitoring the temperature within the computer system;
   dynamically selecting a fan speed step in response to the temperature, wherein the fan speed step is selected from a fan speed table defining a finite number of fan speed steps each having an associated fan speed;
   operating a fan at the dynamically selected fan speed step;
   measuring a fan output variation over a prescribed time interval; and
   automatically modifying the fan speed table to change the fan speeds associated with each fan speed step, wherein the fan speeds are changed as a function of the measured fan output variation while continuing to drive the fan, and wherein automatically modifying the fan speed table includes refining a fan control granularity by narrowing a range of fan speeds associated with the finite number of finite fan speed steps without changing the number of fan speed steps.

6. A non-transitory computer-readable medium with an executable program stored thereon, wherein the program instructs a computer to perform the following steps:
   monitoring the temperature within the computer system;
   dynamically selecting a fan speed step in response to the temperature, wherein the fan speed step is selected from a fan speed table defining a finite number of fan speed steps each having an associated fan speed;
   operating a fan at the dynamically selected fan speed step;
   measuring a fan output variation over a prescribed time interval including obtaining an average and a standard deviation of the fan output over the prescribed time interval; and automatically modifying the fan speed table to change the fan speeds associated with each fan speed step, wherein the fan speeds are changed as a function of the measured fan output variation while continuing to drive the fan, and wherein automatically modifying the fan speed table includes narrowing the range of fan speeds about the average fan output in response to the standard deviation being less than a standard deviation threshold.

7. The computer-readable medium of claim 6, further comprising:
   modifying the fan speed table to restore the fan speed steps to default values in response to the standard deviation being equal or greater than the standard deviation threshold.

* * * * *